United States Patent [19]
Orain

[11] 3,754,411
[45] Aug. 28, 1973

[54] TELESCOPING DRIVE OR PROPELLER SHAFTS

[75] Inventor: Michel Orain, Conflans Saint-Honorine, France

[73] Assignee: Societe Anonyme: Glaenzer Spicer, Poissy, France

[22] Filed: Feb. 28, 1972

[21] Appl. No.: 229,882

[30] Foreign Application Priority Data
Apr. 16, 1971 France ............................... 7113640

[52] U.S. Cl. ................. 64/11 B, 64/23 R, 64/15 R, 64/32 F, 74/493
[51] Int. Cl. ............................................. F16d 6/00
[58] Field of Search ................. 64/23 R, 23.7, 11 B, 64/15 C, 15 R, 27 C, 32 F, 27 R, 3 R, 1 P, 32 R; 74/493

[56] References Cited
UNITED STATES PATENTS
1,471,143 10/1923 Cromwell ........................... 64/15 R
3,401,576 9/1968 Eckels ................................... 74/493
2,035,554 3/1931 Krejnas ............................. 64/27 CT Primary Examiner—Charles J. Myhre
Assistant Examiner—Randall Heald
Attorney—Donald M. Wight et al.

[57] ABSTRACT

A torque transmission device for telescoping drive or propeller shafts. The device comprises a slide relatively slidably mounted within a torque transmission tube and a resilient bellows connected between the slide and a sleeve fixed to an end of the torque transmission tube such that the bellows is in sliding contact with the slide and/or the tube for its stabilization. A first slide ring is mounted on the sleeve for sliding contact with the slide. A second slide ring is also mounted on the sleeve in sliding contact with the slide or at the end of the slide in sliding contact with the interior wall of the torque transmission tube in which case the bellows is enclosed entirely within the tube between the latter and the slide.

9 Claims, 5 Drawing Figures

TELESCOPING DRIVE OR PROPELLER SHAFTS

The present invention concerns an improvement in telescoping drive or propeller shafts by means of which the changes in distance between the driving and driven members are possible without the opposition of a substantial force or resistance irrespective of the torque transmitted.

In the most general case, drives of this type comprise two universal joints whose object is to correct any lack of alignment between the driving member and the driven member and a telescoping shaft enabling changes in the distance between these two members, the combination thus formed being capable of transmitting a large amount of torque in rotation.

The telescoping function of the shaft is generally made possible by the male and female portions of a spline connection provided with a slight amount of play and satisfactorily lubricated for reciprocal sliding of the two component parts.

However, in spite of precautions, it has been found that during torque transmission the axial force necessary to effect the sliding of such a telescoping spline system is very large owing to large amount of friction between the surfaces of the splined connection. For the driving and driven members this results in undesirable over loads coming from the drive which is capable of damaging the bearings.

Further, besides any sliding, the drive acts as a shaft of a fixed length and transmits vibrations and shocks between the driving and driven shafts.

An aim of the present invention is to overcome the drawbacks indicated above and to effect to this end a telescoping device allowing changes in distance between the driving and driven members without the opposition of a substantial force irrespective of the torque transmitted.

The improved torque transmitting device according to the invention consists in a slidable guiding and centering system cooperating with a resilient bellows with regular pleats which is fixed at its ends to two parts sliding in each other and transmitting torque, the bellows being stabilized by the guiding and centering system which is protected by the bellows.

The guiding and centering system may comprise a slide fixed to a shaft or the forked end of a universal joint, a slide ring carried by a sleeve fixed to the end of a torque transmission tube enclosing the said slide being slidable relative to the slide, and a second slide ring carried by the said slide and slidable along the inner wall of the said torque transmission tube, the bellows joining the first shaft or the forked end of the universal joint and the sleeve fixed to the torque transmission tube.

The guiding and centering system may also be constituted by a slide fixed to the shaft or the forked end of a universal joint and two slide rings carried by a sleeve fixed to the torque transmitting tube slide in the slide, the bellows joining the first shaft or the forked end of the universal joint and the sleeve fixed to the torque transmission tube.

The sleeve fixed to the torque transmission tube may slide on a part of the slide disposed inside the torque transmission tube or even on a part of the slide disposed in the bellows.

The slide carrying at its end a slide ring is slidable and the bellows movable in the torque transmission tube totally enclosing the said bellows which has one end fixed on a sleeve ending the said tube and provided with a slide ring, the other end of the bellows being fixed to the end of the slide carrying the other slide ring.

Several embodiments of the device according to the invention are described hereinafter with reference to the accompanying drawings, in which.

Figure 1:
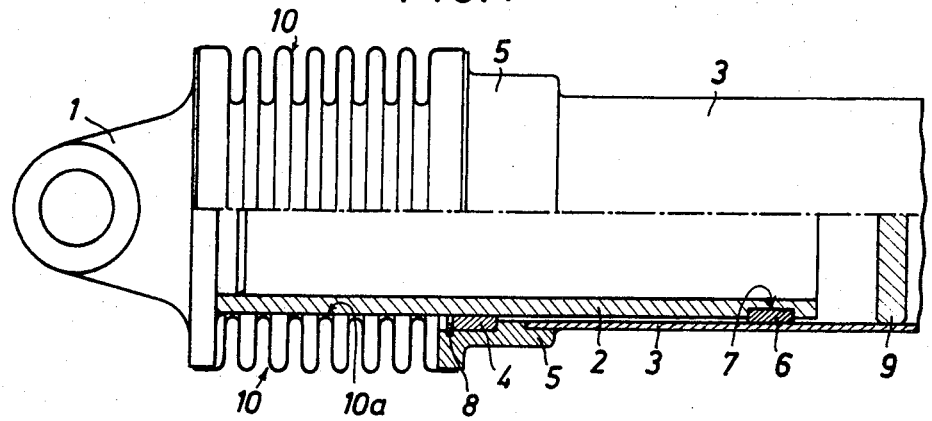
FIG. 1 shows the end of a drive shaft provided with the device.

In a first embodiment shown in FIG. 1, the forked end 1 of a cardan universal joint is welded to the other end of a tubular slide 2 of circular cross section and slidable longitudinally in a correctly calibrated torque transmission tube 3.

The slide 2 is guided in the tube 3 by a slide ring 4 fitted in a sleeve 5 welded to an end of the tube 3 and by a ring 6 received in an annular groove 7 formed in the slide 2.

The slide rings 4 and 6 may be of bronze or of plastic material or any other known low friction material. The ring 4 is held in the sleeve 5 by a resilient split ring 8.

The ring 6 may be formed of two segments of the same material as the ring 4 or an equivalent material.

A sealing plate 9 of plastics material closes the tube 3 and protects the whole guiding chamber in case the slide rings 4 and 6 are in need of lubrication.

On the periphery of the collar of the forked end 1 one of the ends of a resilient bellows 10 is welded, the other end of the bellows 10 being welded to the flange on the sleeve 5.

The resilient bellows (of revolution) 10 is formed from a tube of steel, copper alloy, plastic material or other material and has regularly spaced pleats $10_a$ which slide and are guided along the slide 2 which stabilizes them. This enables the bellows to transmit a large amount of torque: without guiding, the instability of such a bellows under torsion would prevent its use in torque transmission.

The torque applied to the forked end 1 of the cardan universal joint is thus transferred by bellows 10 to the sleeve 5 and to the tube 3 and as the bellows is axially resilient, changes in the length of the drive are possible without introducing angular play.

Moreover, the bellows closes the guiding and centering system which enables it to operate without maintenance in mud, salt water, sand etc.

Figure 2:
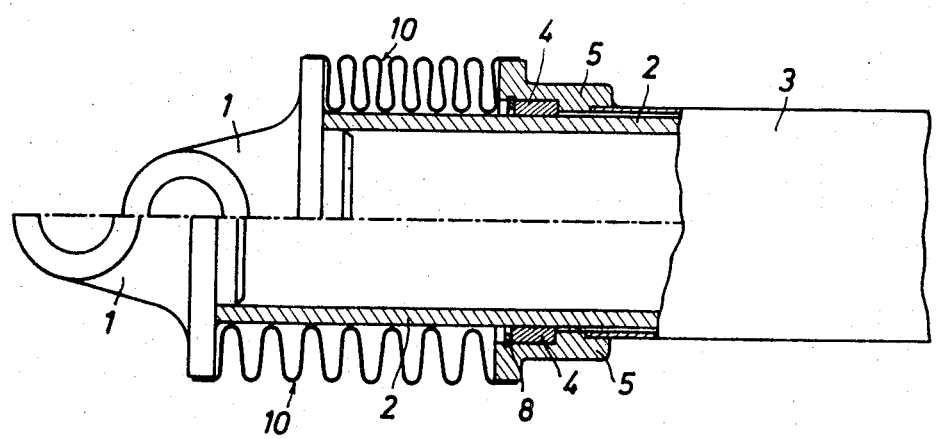
FIG. 2 shows the device in its two extreme sliding positions.

FIG. 2 shows the device in two extreme positions.

Modifications of the device described above can be effected.

Figure 3:
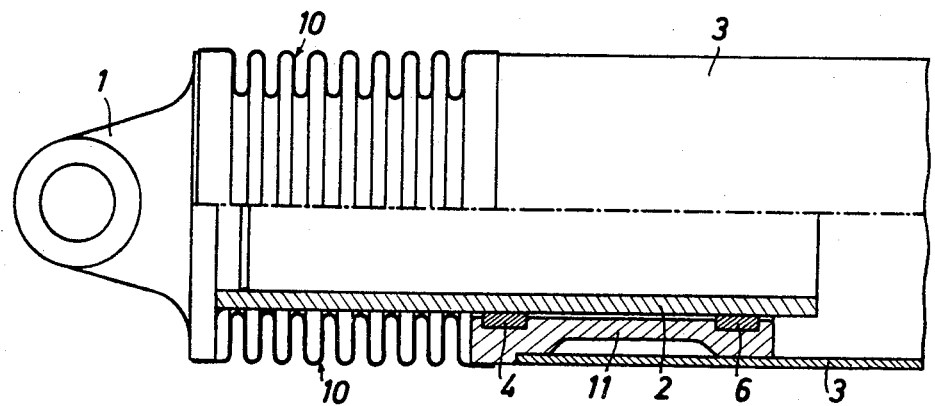
FIG. 3 shows an alternative embodiment of the device.

FIG. 3 shows an embodiment in which the slide rings 4 and 6 are received in annular grooves formed in a sleeve 11 welded to the end of the torque transmission tube 3. One end of the bellows 10 is fixed to the collar of the forked end 1 of the universal joint and the other to the sleeve 11.

Figure 4:
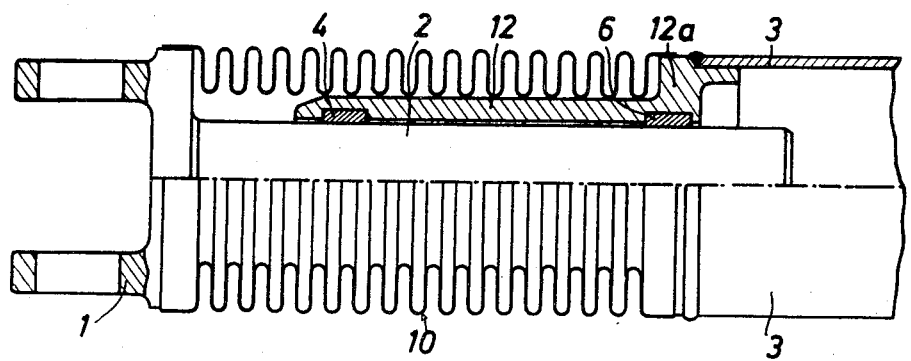
FIG. 4 shows another alternative embodiment.

FIG. 4 illustrates another embodiment in which a sleeve 12 welded to the end of the torque transmission tube 3 is pro-vided with two slide rings 4 and 6 slidable relative to the slide 2 fixed to the forked end 1 of the joint. As in the preceding embodiments the bellows 10 is welded to the collar of the forked end 1 and the flanged end 12a of the sleeve 12.

Figure 5:
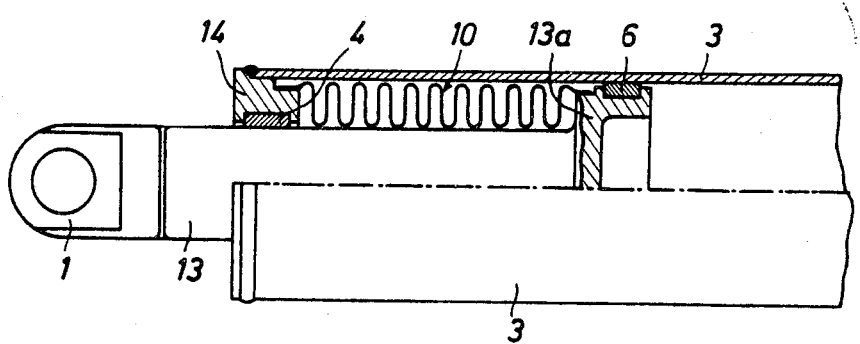
FIG. 5 shows an alternative embodiment with a concealed bellows.

FIG. 5 illustrates another embodiment in which the slide 13 fixed to the forked end 1 of the universal joint is provided with a bearing surface 13a having an annular groove for receiving the slide ring 6.

A sleeve 14 is welded to the end of the torque transmission tube 3 and receives a slide ring 4 in a groove formed therein.

The bellows 10 is welded to the sleeve 14 and to the bearing surface 13a of the slide 13.

In this embodiment, the bellows 10 is housed in the torque transmission tube 3 and is guided by the interior surface of the tube 3 or by the slide 13.

The slide ring 4 may be provided with a seal of a known type and as in the previous embodiments the ring 6 may be formed in two segments.

The advantages of the telescoping system according to the invention are as follows:

great freedom in sliding regardless of the torque transmitted;

an absence of angular play during changes in the direction of torque transmission ;

no wear and thereby great endurance and long life; and lubrication not being essential.

The invention is applicable to all rotary drives requiring the use of telescoping shafts.

What is claimed is:

1. A torque transmission device for telescoping shafts comprising two parts relatively axially slidably mounted in each other for transmitting torque, resilient bellows means having regular pleats connected between the parts for transmitting torque therebetween, and a sliding, guiding and centering system cooperating with said bellows means for stabilization, said bellows means protecting the guiding and centering system.

2. A torque transmission device according to claim 1, wherein one of said parts comprises an axially elognated slide fixed to a shaft or a forked end of a universal joint, and wherein the other of said parts comprises a torque transmission tube enclosing the slide 3. A torque transmission device according to claim 2, wherein a sleeve is mounted on one end of the torque transmission tube and carries a first slide ring in axial sliding contact with said slide, and wherein the bellows means is effectively connected between the slide and the sleeve on said tube.

4. A torque transmission device according to claim 3, wherein a second slide ring is carried by the slide in sliding contact with the interior wall of said tube.

5. A torque transmission device according to claim 3, wherein a second slide ring is also carried by the sleeve in sliding contact with the slide.

6. A torque transmission device according to claim 3, wherein the sleeve is in sliding contact with a portion of the slide situated within said tube.

7. A torque transmission device according to claim 3, wherein the sleeve is in sliding contact with a portion of the slide situated within the bellows means.

8. A torque transmission device according to claim 3, wherein a second slide ring is mounted on the slide in sliding contact with the interior wall of said tube, said bellows means being connected between the sleeve and the end of the slide carrying the second slide ring such that the entire bellows means is enclosed within the torque transmission tube to protect said bellows means from the elements and foreign bodies.

9. A torque transmission device according to claim 1 wherein said guiding and centering system cooperates with said slide substantially throughout the length thereof.

* * * * *